US010459237B2

(12) United States Patent
Seibert et al.

(10) Patent No.: US 10,459,237 B2
(45) Date of Patent: Oct. 29, 2019

(54) SYSTEM, HEAD MOUNTED DEVICE (HMD) AND METHOD FOR ADJUSTING A POSITION OF AN HMD WORN BY A USER

(71) Applicant: DELL PRODUCTS L.P., Round Rock, TX (US)

(72) Inventors: Philip M. Seibert, Austin, TX (US); Vivek Viswanathan Iyer, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 15/886,549

(22) Filed: Feb. 1, 2018

(65) Prior Publication Data
US 2019/0235255 A1    Aug. 1, 2019

(51) Int. Cl.
| G09G 5/00 | (2006.01) |
| G02B 27/01 | (2006.01) |
| G02B 27/00 | (2006.01) |
| G06T 19/00 | (2011.01) |

(52) U.S. Cl.
CPC ..... G02B 27/0179 (2013.01); G02B 27/0093 (2013.01); G02B 27/017 (2013.01); G06T 19/006 (2013.01); G02B 2027/0187 (2013.01)

(58) Field of Classification Search
USPC .............................. 345/419, 633, 8, 428, 174
See application file for complete search history.

(56) References Cited

U.S. PATENT DOCUMENTS

| 7,572,008 | B2 | 8/2009 | Elvesjo et al. | |
| 9,959,127 | B2 | 5/2018 | Seibert et al. | |
| 2014/0176528 | A1* | 6/2014 | Robbins | G02B 27/225 |
| | | | | 345/419 |
| 2015/0049114 | A1* | 2/2015 | Geisner | A63F 13/02 |
| | | | | 345/633 |
| 2016/0091720 | A1* | 3/2016 | Stafford | G02B 27/0172 |
| | | | | 345/8 |
| 2016/0133055 | A1* | 5/2016 | Fateh | G06F 3/147 |
| | | | | 345/633 |
| 2016/0133170 | A1* | 5/2016 | Fateh | G06F 3/147 |
| | | | | 345/428 |
| 2016/0170481 | A1* | 6/2016 | Fateh | G06F 3/147 |
| | | | | 345/174 |

(Continued)

OTHER PUBLICATIONS

Nidec Sankyo Corporation, Stepping Motors, PM Type Stepping Motors MSEV Series, Printed From Internet Dec. 8, 2017, 2 pgs.

(Continued)

*Primary Examiner* — Thuy N Pardo
(74) *Attorney, Agent, or Firm* — Egan Peterman Enders Huston

(57) ABSTRACT

The present disclosure provides embodiments of improved systems, head mounted devices (HMDs) and methods for adjusting a position of an HMD with respect to a user based on one or more measurements, which are specific to the user. One embodiment of the improved method includes receiving data from an eye tracking system of an HMD worn by a user, where the data is generated by the eye tracking system in response to the user gazing upon a virtual image plane of the HMD; using the received data to calculate a distance between the virtual image plane of the HMD and a pupil plane of the user; and adjusting a position of the HMD with respect to the user based on the calculated distance.

26 Claims, 6 Drawing Sheets

(56) References Cited

U.S. PATENT DOCUMENTS

| | | | |
|---|---|---|---|
| 2016/0202487 A1* | 7/2016 | Iguchi | G02B 27/017 |
| | | | 345/8 |
| 2016/0284129 A1* | 9/2016 | Nishizawa | G06F 3/013 |
| | | | 345/8 |
| 2016/0379408 A1* | 12/2016 | Wright | G06T 19/006 |
| | | | 345/633 |
| 2017/0017299 A1 | 1/2017 | Biedert et al. | |
| 2017/0316264 A1 | 11/2017 | Gustafsson et al. | |
| 2018/0031848 A1* | 2/2018 | Huang | G02B 27/0179 |
| | | | 345/8 |
| 2018/0203232 A1* | 7/2018 | Bouchier | G02F 1/13342 |
| | | | 345/633 |

OTHER PUBLICATIONS

Microsoft, "A New Way to See Your World", Printed from Internet May 8, 2018, 6 pgs.
Wikipedia, "Oculus Rift", Dec. 25, 2017, 17 pgs.
Wikipedia, "Microsoft HoloLens", Dec. 4, 2017, 9 pgs.
Crecente, "Magic Leap: Founder of Secretive Start-Up Unveils Mixed-Reality Goggles", Rolling Stone, Dec. 2017, 38 pgs.
Jovin, Intel, "Intel Prepares to Pull Recon Jet as Part of Its retreat From Wearables", Jul. 2017, 2 pgs.
Wikipedia, "HTC Vive", Oct. 5, 2017, 7 pgs.
Odom, "A Hands-On With the Meta 2 Head-Mounted Display", Hardware Review, Jul. 2017, 6 pgs.
Wikipedia, "Google Glass", Jan. 23, 2018, 16 pgs.
Palladino, "Avegant Light Field Technology Now Available to AR Display Makers via Development Kits", Next Reality, Oct. 2017, 4 pgs.
"How Do Tobii Eye Trackers Work", 2017, 7 pgs.

* cited by examiner

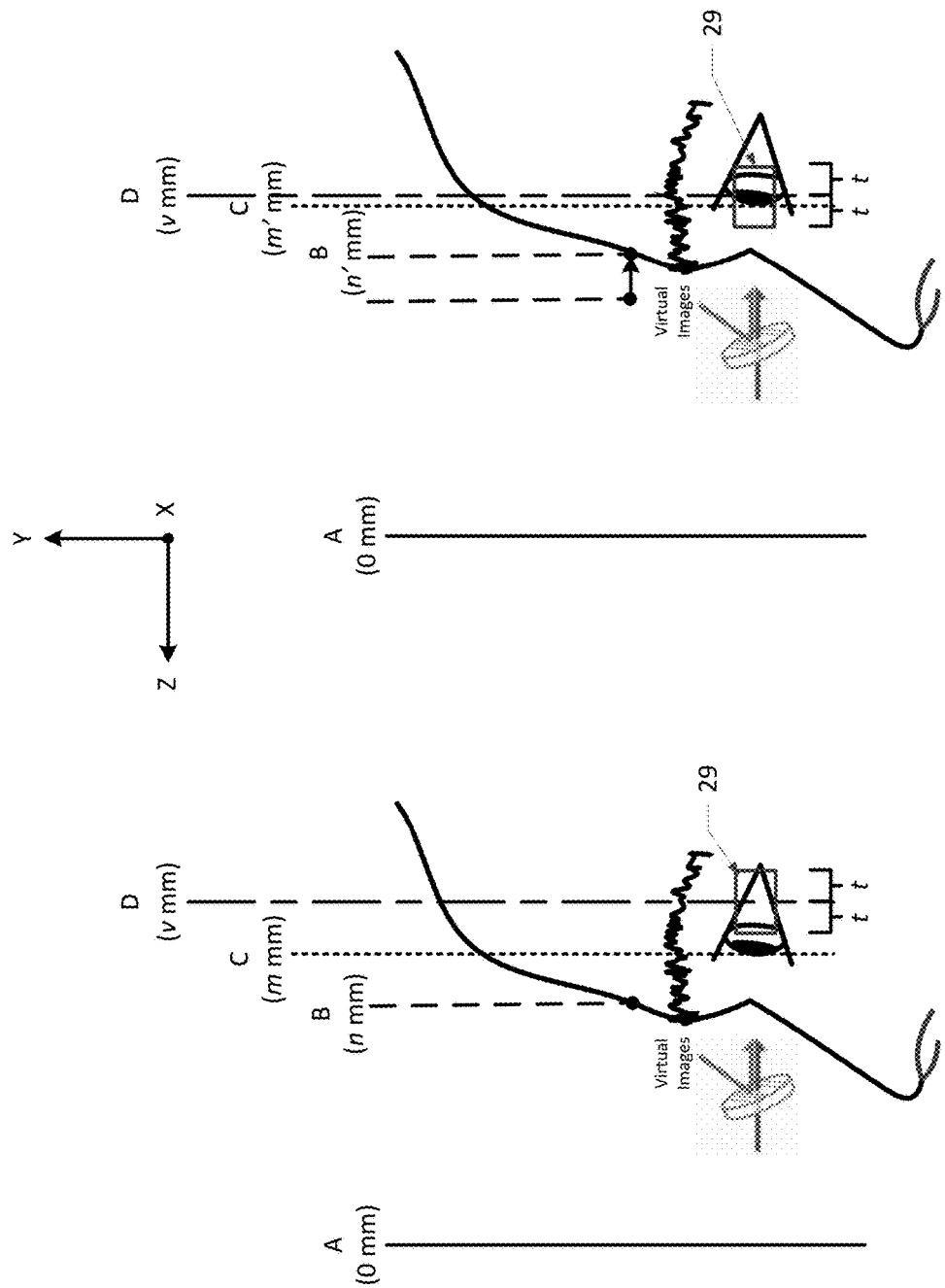

SYSTEM, HEAD MOUNTED DEVICE (HMD) AND METHOD FOR ADJUSTING A POSITION OF AN HMD WORN BY A USER

FIELD OF THE INVENTION

This invention relates generally to head mounted devices (HMDs), and more particularly to methods for adjusting a position of an HMD worn by a user.

BACKGROUND OF THE INVENTION

As used herein, a head mounted device (HMD) is an electronic device worn by a user on, or otherwise coupled to, the user's head. In some embodiments, an HMD may contain, or be adapted to receive, a display that may be used to provide digital images and/or information to the user on a physical image plane of the HMD. For example, the images and/or information provided on the HMD display may completely immerse the user in digitally-generated surroundings, thereby providing the user with a Virtual Reality (VR) experience that simulates a different reality than the user's physical surroundings. In other embodiments, digital entities (e.g., images and/or information) may be projected towards the user's eye(s) to enhance what the user sees in their physical environment, thereby providing an Augmented Reality (AR) or Mixed Reality (MR) experience to the user. In AR/MR HMDs, a complex set of optics is often required to combine the projected digital entities with the images or light received from the user's environment.

Once the user dons an HMD, the user is often required to manually adjust the position of the HMD on the user's head until the user perceives that the digital images and/or information is in the user's field of view and in focus. This is a highly subjective, trial-and-error process that often requires a lot of "fiddling" on the user's part. It is, therefore, desirable to provide a more accurate method for adjusting a position of an HMD with respect to the user based on one or more measurements specific to the user.

SUMMARY OF THE INVENTION

The following description of various embodiments of systems, head mounted devices (HMDs) and methods for adjusting a position of an HMD worn by a user is not to be construed in any way as limiting the subject matter of the appended claims.

Generally speaking, the present disclosure provides an improved system, HMD and method for adjusting a position of an HMD with respect to a user based on one or more measurements, which are specific to the user. As described in more detail below, the system and method provided herein determines the unique location of the user's pupil plane (i.e., a vertical plane extending through and/or encompassing the user's pupils), calculates a distance between a virtual image plane of the HMD and the pupil plane of the user, and adjusts the position of the HMD with respect to the user based on the calculated distance.

According to one embodiment, a method is provided herein for adjusting a position of an HMD with respect to a user. In some embodiments, the method may begin by receiving data from an eye tracking system of a head mounted device (HMD) worn by a user, where the data is generated by the eye tracking system in response to the user gazing upon a virtual image plane of the HMD. In addition, the method may include using the received data to calculate a distance between the virtual image plane of the HMD and a pupil plane of the user, and adjusting a position of the HMD with respect to the user based on the calculated distance.

In some embodiments, the data received from the eye tracking system may comprise a gaze direction and an inter-pupillary distance (IPD) measurement, and the distance may be calculated using the gaze direction and the IPD measurement. In other embodiments, the data received from the eye tracking system may comprise a gaze direction, and the distance may be calculated using the gaze direction and an IPD measurement received from a position sensor on the HMD. In other embodiments, the data received from the eye tracking system may comprise a plurality of frames of image data from the eye tracking system, each frame corresponding to an image of one of the user's eyes. In such embodiments, the distance may be calculated by using the plurality of frames of image data to measure an IPD between the user's eyes and determine a gaze direction, and by using the IPD measurement and the gaze direction to calculate the distance.

The HMD may further comprise a pad and at least one optical assembly. The pad may be provided on the HMD and may be configured to contact at least a portion of the user's face. The optical assembly may be configured to combine virtual images with what the user sees in their physical environment (e.g., real world images, and may include an eye box within which virtual images are projected towards the user's eye, and an eye box center plane located at a center point of the eye box. In some embodiments, the step of adjusting a position of the HMD may include linearly translating the pad toward or away from the user until the eye box center plane is substantially aligned with the pupil plane. In other embodiments, the step of adjusting a position of the HMD may include linearly translating the at least one optical assembly toward or away from the user until the eye box center plane is substantially aligned with the pupil plane.

According to another embodiment, a head mounted device (HMD) configured to be worn by a user is provided herein. In addition to other components, the HMD may include an eye tracking system, a processing device and an adjustment component. The eye tracking system may be configured to generate data in response to the user gazing upon a virtual image plane of the HMD. The processing device may be coupled to receive the data from the eye tracking system, and may be configured to execute program instructions to calculate a distance between the virtual image plane of the HMD and a pupil plane of the user using the received data. The adjustment component may be configured to adjust a position of the HMD with respect to the user based on the calculated distance.

In some embodiments, the data received from the eye tracking system may comprise a gaze direction and an inter-pupillary distance (IPD) measurement, and the processing device may be configured to execute the program instructions to calculate the distance using the gaze direction and the IPD measurement. In other embodiments, the data received from the eye tracking system may comprise gaze direction, and the processing device may be configured to execute the program instructions to calculate the distance using the gaze direction received from the eye tracking system and an IPD measurement received from a position sensor on the HMD. In yet other embodiments, the data received from the eye tracking system may comprise a plurality of frames of image data from the eye tracking system, each frame corresponding to an image of one of the user's eyes. In such embodiments, the processing device may be configured to execute the program instructions to measure an IPD between the user's eyes and determine a gaze direction from the plurality of frames of image data, and to calculate the distance using the IPD measurement and the gaze direction.

The HMD may further comprise a pad and at least one optical assembly. The pad may be provided on the HMD and may be configured to contact at least a portion of the user's face. The at least one optical assembly may be configured to combine virtual images on the virtual image plane with real world images. As noted above, the at least one optical assembly may include an eye box within which the virtual images are projected towards the user's eye, and an eye box center plane located at a center point of the eye box. In some embodiments, the adjustment component of the HMD may be configured to adjust the position of the HMD by linearly translating the pad or the at least one optical assembly toward or away from the user until the eye box center plane is substantially aligned with the pupil plane.

In some embodiments, the adjustment component may comprise a stepper motor coupled to the pad and a stepper motor controller. The stepper motor controller may be coupled to receive signals from the processing device for controlling the stepper motor, so as to perform the linear translation by extending the pad toward or away from the user.

In other embodiments, the adjustment component may comprise a stepper motor coupled to the at least one optical assembly, and a stepper motor controller coupled to receive signals from the processing device for controlling the stepper motor, so as to perform the linear translation by extending the at least one optical assembly toward or away from the user In other embodiments, the adjustment component may comprise a display of the HMD, and program instructions executable by the processing device for displaying guidance to the user on the display of the HMD. In such embodiments, the user may use the displayed guidance to perform the linear translation manually by extending the pad or the at least one optical assembly toward or away from the user.

According to yet another embodiment, a system comprising an HMD and an information handling system is provided herein. In this embodiment, the HMD may generally include an eye tracking system, which is configured to generate data in response to the user gazing upon a virtual image plane of the HMD, and a communication interface configured to transmit the data generated by the eye tracking system. The information handling system may generally include a communication interface and a processing device. The communication interface of the information handling system may be coupled to receive the data transmitted from the HMD. The processing device may be configured to execute program instructions to calculate a distance between the virtual image plane of the HMD and a pupil plane of the user using the received data, and to transmit signals via the communication interface of the information handling system to the HMD for adjusting a position of the HMD with respect to the user based on the calculated distance. The communication interface of the HMD may be further configured to receive the signals transmitted from the information handling system.

The HMD may further comprise a pad, at least one optical assembly and an adjustment component. The pad may be provided on the HMD and may be configured to come in contact with at least a portion of the user's face. The at least one optical assembly may be configured to combine virtual images on the virtual image plane with real world images. The optical assembly may include an eye box within which the virtual images are projected towards the user's eye, and an eye box center plane located at a center point of the eye box. The adjustment component of the HMD may be configured to use the transmitted signals to adjust the position of the HMD with respect to the user until the eye box center plane is substantially aligned with the pupil plane.

In some embodiments, the adjustment component of the HMD may comprise a stepper motor coupled to the pad, and a stepper motor controller. The stepper motor controller may be coupled to receive the signals transmitted from the information handling system and may be configured to use the transmitted signals to control the stepper motor, so as to extend the pad toward or away from the user until the eye box center plane is substantially aligned with the pupil plane.

In other embodiments, the adjustment component of the HMD may comprise a stepper motor coupled to the at least one optical assembly, and a stepper motor controller. The stepper motor controller may be coupled to receive the transmitted signals and may be configured to use the transmitted signals to control the stepper motor, so as to extend the optical assembly toward or away from the user until the eye box center plane is substantially aligned with the pupil plane.

In other embodiments, the adjustment component of the HMD may comprise a display of the HMD. In such embodiments, the display may be configured to display guidance to the user to manually extend the pad or the at least one optical assembly toward or away from the user until the eye box center plane is substantially aligned with the pupil plane. The guidance displayed to the user on the display may be determined by the signals transmitted from the information handling system.

BRIEF DESCRIPTION OF THE DRAWINGS

Other advantages of the invention will become apparent upon reading the following detailed description and upon reference to the accompanying drawings in which:

FIG. 4 is a graphical representation of various planes associated with an HMD and a user before adjusting a position of the HMD with respect to the user;

FIG. 5 is a graphical representation of various planes associated with an HMD and a user after a position of the HMD is adjusted with respect to the user;

Figure 1:
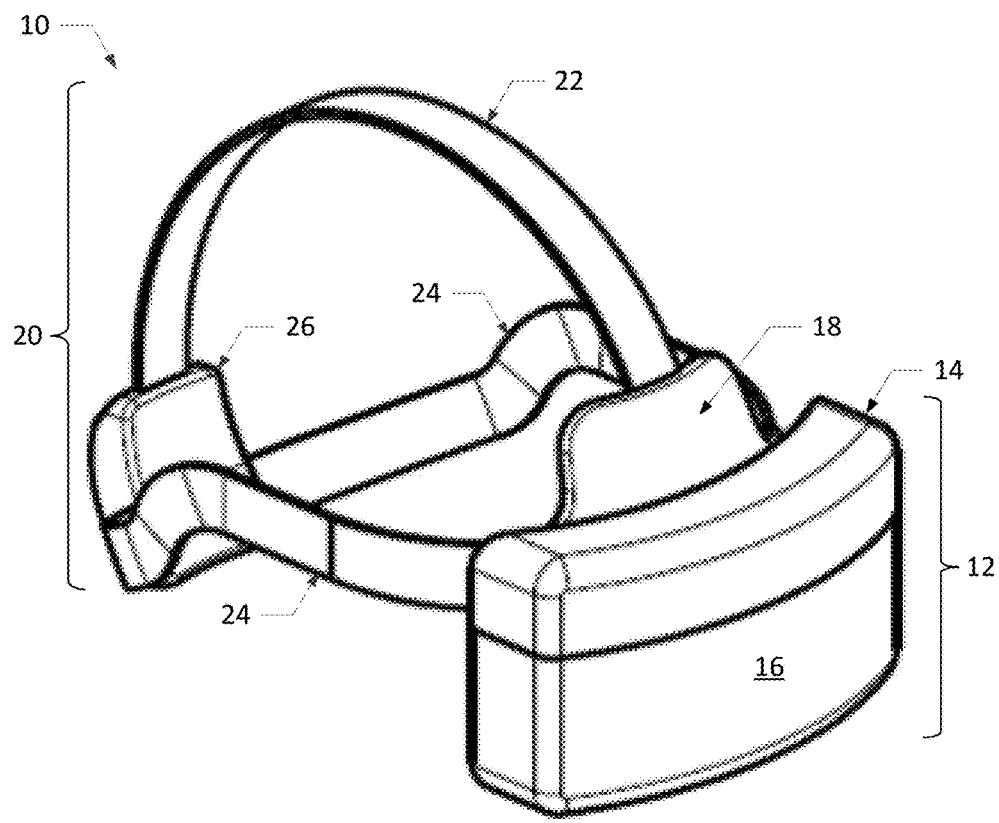
FIG. 1 is a front perspective view illustrating one example of a head mounted device (HMD)

While the present disclosure is susceptible to various modifications and alternative forms, specific embodiments thereof are shown by way of example in the drawings and will herein be described in detail. It should be understood, however, that the drawings and detailed description thereto are not intended to limit the disclosure to the particular form disclosed, but on the contrary, the present disclosure is to cover all modifications, equivalents and alternatives falling within the spirit and scope of the present disclosure as defined by the appended claims.

DESCRIPTION OF ILLUSTRATIVE EMBODIMENTS

Figure 2:
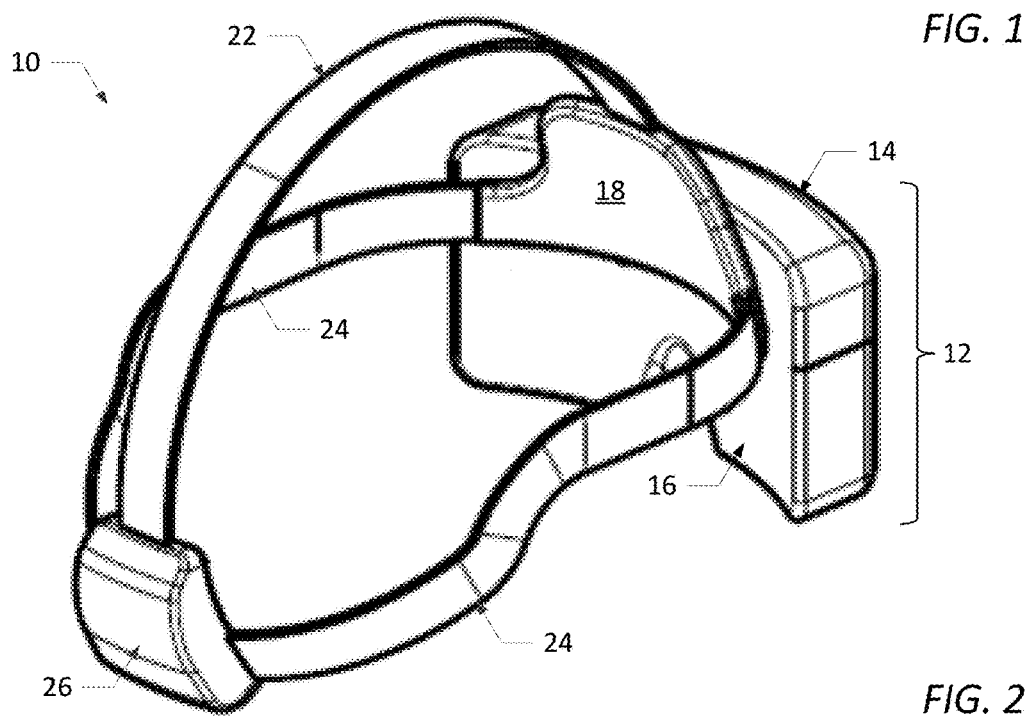
FIG. 2 is a rear perspective view of the example HMD illustrated in FIG. 1.
Figure 3:
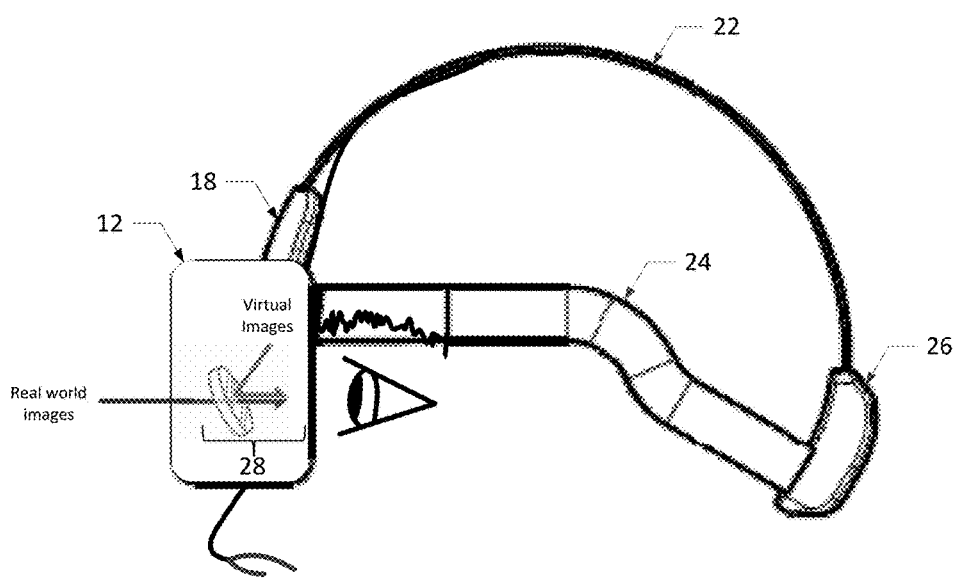
FIG. 3 is a side view of the example HMD illustrated in FIG. 1.

FIGS. 1-3 respectively provide a front perspective view, a rear perspective view and a side view of one example embodiment of a head mounted device (HMD) 10 that may be worn by a user. It is noted that the system and method described herein is not limited to use within the HMD 10 specifically illustrated in FIGS. 1-3. Instead, FIGS. 1 and 2 are provided to illustrate typical components of an HMD.

As shown in FIGS. 1-3, HMD 10 generally includes a housing 12, a pad 18, and a head positioning component 20. The pad 18 provided on the HMD 10 may be generally configured to contact at least a portion of the user's face. In the illustrated embodiment, the pad 18 is configured to come in contact with the user's forehead. Although the pad 18 shown in FIGS. 1-3 is illustrated as a single pad encompassing a large portion of the user's forehead, the pad is not strictly limited to the exemplary depiction shown. In some embodiments, the head positioning component 20 of HMD 10 may include a head band 22 that extends over the user's head and a pair of temple bands 24 that extend over the user's ears to secure the HMD onto the user's head. In some embodiments, the head positioning component 20 may further include a component 26, which may be configured to adjust the length of the head band 22 and/or the length of the temple bands 24 to adjust the fit the HMD. In other embodiments, head positioning component 20 may be replaced with a pair of temples (i.e., arms extending from housing 12 on either side of the user's head that rest upon or come in contact with the user's ears). It is noted that HMD 10 is not strictly limited to the example depiction shown in FIGS. 1-3 and may be alternatively implemented in other embodiments. In some embodiments, for example, the shape and size of the housing 12 may be significantly altered, such that HMD 10 more closely resembles user eyewear (e.g., glasses, sunglasses, etc.).

Housing 12 may generally include an upper portion 14 and a lower portion 16. As described in more detail below, an eye tracking system in addition to other electronic and/or mechanical components may be housed within the upper portion 14 and lower portion 16. As shown in FIG. 3, the lower portion 16 may include a transparent surface through which the user views their physical surroundings (e.g., views real world images), and may contain an optical assembly 28 that combines digitally generated virtual images with real world images. More specifically, optical assembly 28 may be configured to combine digital entities (e.g., images and/or information), which are projected towards the user's eye(s), with what the user sees in their physical environment to provide an Augmented Reality (AR) or Mixed Reality (MR) experience to the user. Optical assembly 28 may include any optical component or combination of optical components capable of combining digitally generated virtual images with real world images. Examples of optical component(s) that may be included within optical assembly include, but are not limited to, prisms, beam splitters, mirrors, waveguides, diffraction gratings and light field technology. The virtual images may be generated by electronics included within the upper portion 14 of the housing 12, or by an external source communicatively coupled to the HMD.

FIGS. 4 and 5 illustrate various planes associated with the user and with the optical assembly 28 of the HMD. For example, the virtual images projected from optical assembly 28 may appear, to the user, as if they are presented on a virtual image plane A projected in front of the user. Plane B is a reference plane located at a distance n millimeters (mm) from the virtual image plane A. In the illustrated embodiment, reference plane B is located at the point of contact between pad 18 and the user's forehead. In other embodiments, reference plane B may be located at other points of contact on the user's face (e.g., the bridge of the user's nose, the top of the user's ears, etc.). Place C is a pupil plane, or a vertical plane extending through and/or encompassing the user's pupils. In FIG. 4, pupil plane C is initially located at a distance m millimeters (mm) from the virtual image plane A prior to adjustment of the HMD. In conventional HMDs, the location of pupil plane C and the distance, m, is unknown and varies from user to user.

As shown in FIGS. 4-5, optical assembly 28 has a corresponding eye box 29 within which virtual images are projected to the user's eyes. Although illustrated in FIGS. 4 and 5 as 2-D, eye box 29 is a 3-D construct having x (left/right), y (up/down) and z (in/out) dimensions. Eye box center plane D is a vertical plane extending through a center point of the eye box 29, and is located at a distance v millimeters (mm) from the virtual image plane A. The distance, v, is dependent on the design of the HMD and is a fixed distance, which does not change. In order for the user to see the virtual images provided by the optical assembly 28, the user's pupil plane C must lie within some portion of the eye box 29. Higher quality virtual images may be obtained when the center point of the eye box 29 (i.e., eye box center plane D) is positioned at pupil plane C, or very near pupil plane C within a tolerance t millimeters (mm) on either side of the plane D (as shown in FIG. 5).

A problem arises when different users, having different facial features, attempt to view the virtual images presented to the user on virtual image plane A of HMD 10. For example, differences in forehead slope and/or eye depth may cause the distance m–n between pupil plane C and reference plane B to vary from user to user. Since the distance, v, is fixed, the center point of the eye box 29 at plane D may not initially be aligned with the pupil plane C, as shown in FIG. 4. This misalignment may require some users to repeatedly reposition or fiddle with the HMD placement until plane D is repositioned near pupil plane C, as shown in FIG. 5.

The present disclosure overcomes problems associated with conventional HMDs by providing an improved system and method for adjusting a position of an HMD with respect to a user based on one or more measurements, which are specific to the user. As described in more detail below, the system and method described herein determine the unique location of the user's pupil plane C, calculate the distance, m, between the image plane A of the HMD and the pupil plane C of the user, and adjust the position of the HMD with respect to the user based on the calculated distance, m. In this manner, the system and method described herein provide an accurate means for positioning the HMD, which does not require the user to reposition or fiddle with the HMD placement to achieve high quality virtual images on the virtual image plane.

Figure 6:
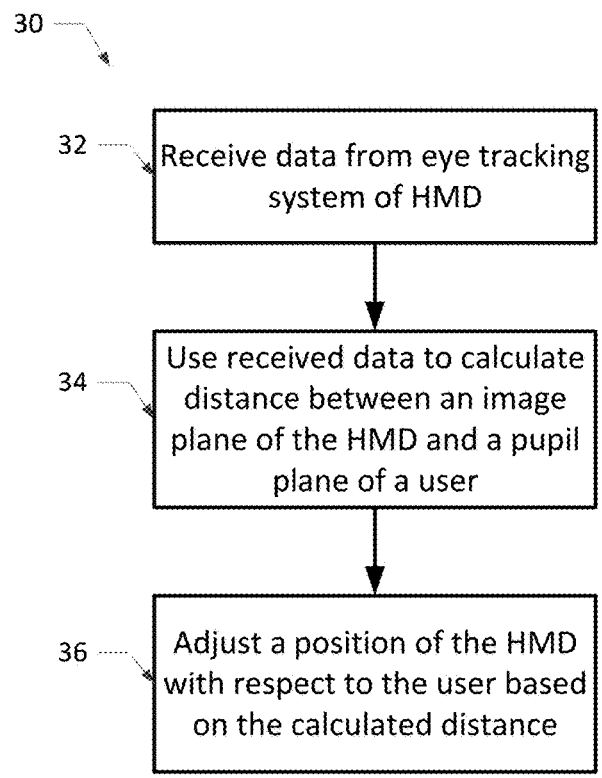
FIG. 6 is a flowchart diagram illustrating one embodiment of a method for adjusting a position of an HMD with respect to a user.

FIG. 6 is a flowchart diagram illustrating one embodiment an improved method 30 for adjusting a position of an HMD with respect to a user in accordance with the present disclosure. According to one embodiment, method 30 may begin (in step 32) by receiving data from an eye tracking system of an HMD worn by a user. The received data may comprise substantially any data that is generated by an eye tracking system in response to the user gazing upon the virtual image plane A of the HMD. In some embodiments, the data received by the eye tracking system may include one or more of the following: a gaze point location, a gaze direction, one or more gaze vectors, and an inter-pupillary distance (IPD) measurement. In other embodiments, the received data may include a plurality of frames of image data captured by the eye tracking system, where each frame corresponds to an image of one of the user's eyes.

Eye tracking systems and other gaze detection technology are well known in the art, and are generally used to detect the position and/or gaze direction of the user's eyes. Some eye tracking systems may include one or more light sources positioned for illuminating the user's eyes, and one or more photosensors (or cameras) positioned for detecting light reflected off the user's eyes. Some eye tracking system may additionally or alternatively include a "world facing camera," or a camera positioned for capturing images of the user's physical environment in the user's front field of view.

In some embodiments, an eye tracking system in accordance with the present disclosure may include a control unit or other processing device, which is configured to generate eye tracking data based on the light reflected off the user's eyes and detected by the photosensors of the eye tracking system. Eye tracking data may include, but is not limited to, a gaze point location, a gaze direction, one or more gaze vectors, and an inter-pupillary distance (IPD) measurement as eye tracking data. The gaze point location (GP) is the location of the user's gaze (i.e., the point at which the user is looking). Gaze vectors ($G_1$ and/or $G_2$) include the gaze direction ($\theta$) (i.e., the direction of the user's gaze) and the distance (magnitude of the gaze vector) between the gaze point and the user's eyes. The inter-pupillary distance (IPD) is the distance between the user's pupils. Some eye tracking systems may be configured to provide all of the eye tracking data mentioned above. Other eye tracking systems may only be configured to provide a subset of this data, such as gaze direction and IPD. Other eye tracking systems may only provide one eye tracking datum, such as gaze direction.

Figure 7:
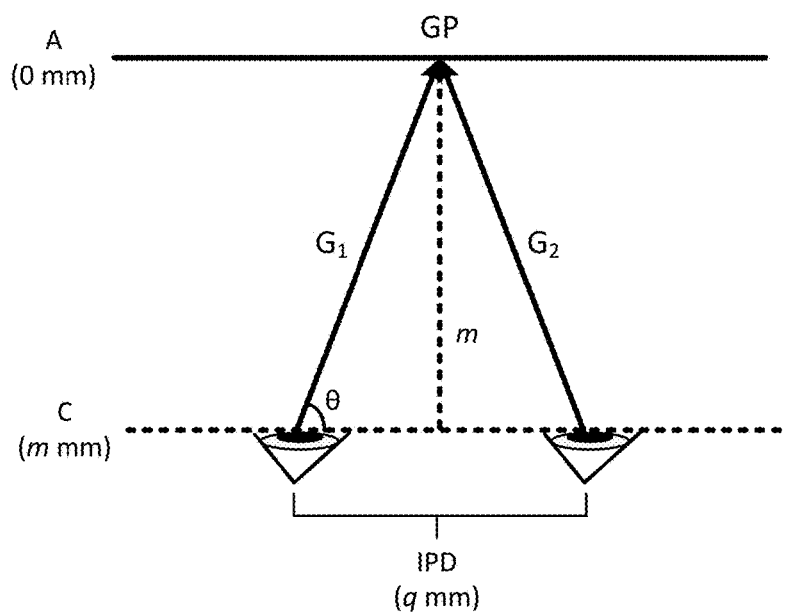
FIG. 7 is a diagram illustrating one manner in which a distance, m, between a virtual image plane A of an HMD and a pupil plane C of a user may be calculated.

In some embodiments, the gaze point location (GP) may be fixed at a predefined location by presenting an image and/or other information to the user on the virtual image plane A of the HMD at the predefined location. In some embodiments, the gaze point (GP) location may be fixed at a predefined location along a centerline bisecting the user's eyes (as shown in FIG. 7) to simplify the calculation of the distance, m, between the pupil plane C and the virtual image plane A, as set forth below.

To generate eye tracking data, the control unit or other processing device of the eye tracking system may detect "glints" or reflections of light, which are reflected off the user's eyes and detected by the photosensor(s) or camera(s) of the eye tracking system. The detection of "glints" and the calculation of eye tracking data may be achieved using a variety of well-known techniques (including 2D and/or 3D techniques). Once calculated by the eye tracking system, at least a subset of the generated eye tracking data (e.g., at least the gaze direction) may be received in step 32 of FIG. 6.

In some embodiments, the data received from the eye tracking system in step 32 of the method shown in FIG. 6 may include gaze direction ($\theta$) and an IPD measurement. In other embodiments, the data received from the eye tracking system in step 32 may only include the gaze direction ($\theta$), and the IPD measurement may be obtained from another component of the HMD. For example, the HMD may include two optical assemblies (one for each eye). Each optical assembly may include hardware for translating the optical assemblies closer together (to provide smaller IPD distance) or farther apart (larger IPD distance), and a position sensor to detect the position of each optical assembly. In this example, the position detected by the position sensors may be used to calculate an IPD measurement, which may be later used along with the gaze direction from eye tracking system to calculate the distance, m.

In other embodiments, the data received from the eye tracking system in step 32 of the method shown in FIG. 6 may include a plurality of frames of image data that are captured by the photosensor(s) or camera(s) of the eye tracking system, where each frame corresponds to an image of one of the user's eyes. In such embodiments, a control unit or processing device external to the eye tracking system may be used to determine eye tracking data (e.g., one or more of a gaze point location, gaze direction, gaze vectors, and an inter-pupillary distance (IPD) measurement) based on the frames of image data received in step 32 of FIG. 6.

In step 34 of FIG. 6, the data received in step 32 is used to calculate a distance, m, between the image plane A of the HMD and the pupil plane C of the user. FIG. 7 is a diagram illustrating one manner in which a distance, m, may be calculated. As shown in FIG. 7, the distance, m, may be calculated according to EQ. 1:

$$m = \frac{q}{2}\tan\theta \qquad \text{EQ. 1}$$

where q (mm) is the IPD measurement and $\theta$ is the gaze direction. As noted above, the gaze direction, $\theta$, may be provided by the eye tracking system. The IPD measurement, q, may be provided by the eye tracking system or by a position sensor provided on the HMD. EQ. 1 (or a similar equation) may be used to determine the distance, m, between the virtual image plane A of the HMD and the pupil plane C of the user when the gaze point (GP) location is fixed at a predefined location along a centerline bisecting the user's eyes, as shown in FIG. 7. Other equation(s) may be used when the gaze point location is not fixed at such a location.

In other embodiments, at least one gaze vector ($G_1$ and/or $G_2$) may be received from the eye tracking system in step 32 of FIG. 6, and the gaze direction, $\theta$, may be calculated therefrom prior to calculating the distance, m. EQ. 2 illustrates one manner in which the gaze direction, $\theta$, may be calculated using an IPD measurement and at least one gaze vector:

$$\theta = \cos^{-1}\left[\frac{q}{2\|G_1\|}\right] \qquad \text{EQ. 2}$$

where q (mm) is the IPD measurement and $\|G_1\|$ is the magnitude of gaze vector $G_1$. Once the gaze direction, $\theta$, is determined in EQ. 2, EQ. 1 (or a similar equation) may be used to determine the distance, m, between the image plane A of the HMD and the pupil plane C of the user.

In step 36 of FIG. 6, the position of the HMD with respect to the user may be adjusted based on the calculated distance, m. As shown in FIG. 5, the position of the HMD may be adjusted by linearly translating at least a portion of the HMD toward/away from the user until the eye box center plane D is substantially aligned with the user's pupil plane C. This may be achieved, in one embodiment, by adjusting the position of the forehead pad at reference plane B until the eye box center plane D is substantially aligned with the pupil plane C within some tolerance t millimeters (mm) on either side of plane D, as shown in FIG. 5. In other words, the distance, n, may be linearly modified in the z-direction by an amount equal to v−m±t to achieve the adjustment shown in FIG. 5.

The present disclosure contemplates adjusting the position of the HMD (in step 36 of FIG. 6) in a variety of different ways. In some embodiments, the position of the HMD may be adjusted by controlling a motor provided on the HMD to perform the linear translation. In one example, a stepper motor may be positioned between housing 12 and pad 18 of HMD 10 for extending the pad 18 at reference plane B toward/away from the user, thereby moving the housing 12 containing optical assembly 28 away from/toward the user. In another example, a motor provided within the HMD may be used to linearly translate the optical assembly 28 toward/away from reference plane B. In such embodiments, the linear translation of pad 18 or optical assembly 28 may be performed automatically by various HMD components, without user intervention or assistance, to position the center plane D of eye box 29 at, or very near, the pupil plane C.

In other embodiments, the position of the HMD may be adjusted by providing guidance to the user to assist the user in performing the linear translation manually. In one example, guidance may be provided on a display of the HMD 10 to instruct the user to manually extend the pad 18 or the optical assembly 28 toward/away from the user. The guidance provided on the display of the HMD may include images, text and/or other visual indication of the direction (e.g., in or out along the Z-axis) and amount (Δz) by which the pad or optical assembly should be extended to adjust the position of the HMD, so as to position the center plane D of eye box 29 at, or very near, the pupil plane C. In another example, guidance may be provided on a display of the HMD 10 to instruct the user to adjust the head positioning component 20 to reposition of the HMD.

Figure 8:
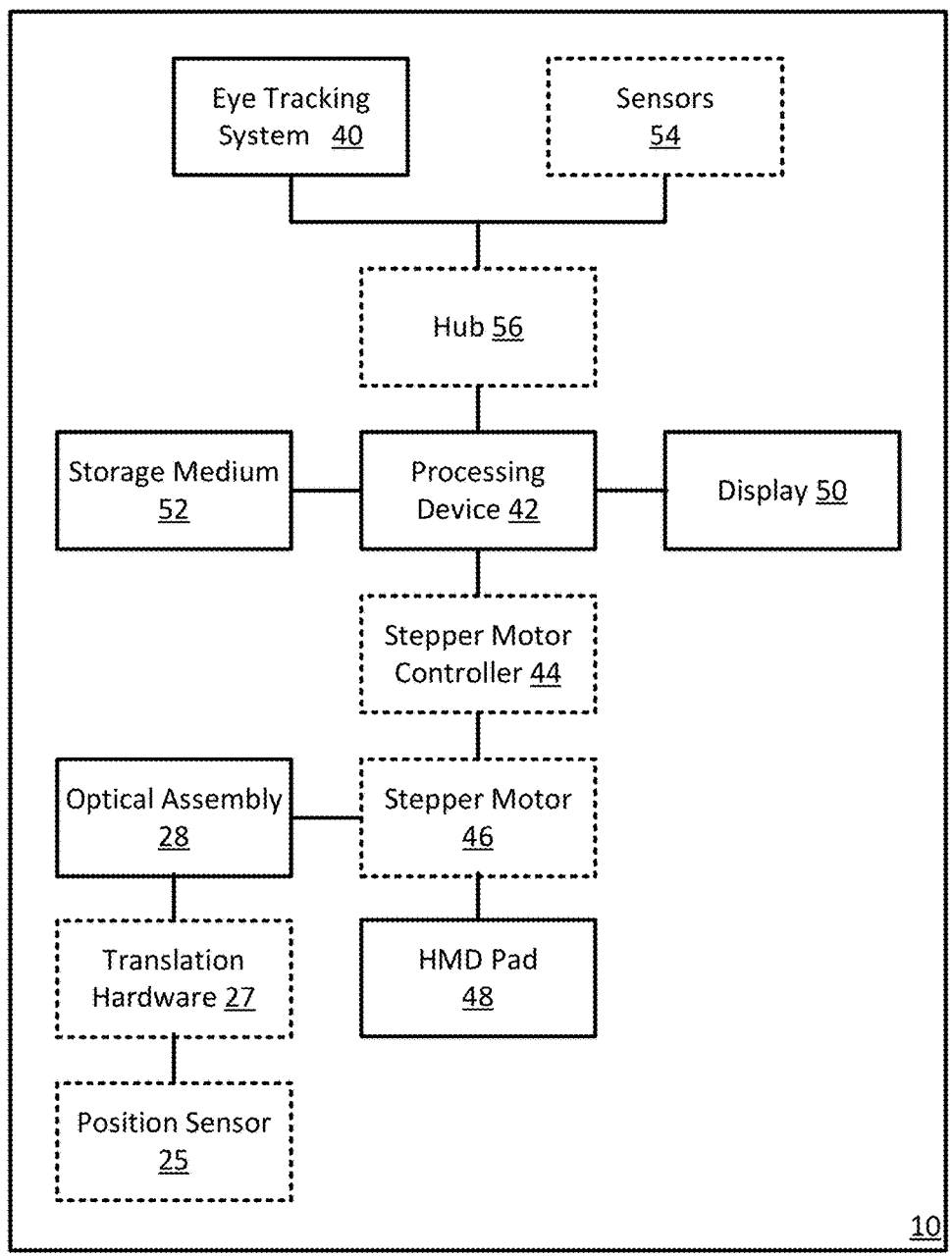
FIG. 8 is a block diagram illustrating one embodiment of an HMD configured to perform the method shown in FIG. 6.

FIG. 8 is a block diagram illustrating one embodiment of an HMD 10, which is configured to perform all steps of the method shown in FIG. 6. It is noted that other components not specifically shown in FIG. 8 may also be included within the HMD. For purposes of brevity, only components relevant to the present disclosure are illustrated in FIG. 8.

As shown in FIG. 8, HMD 10 may include an optical assembly 28, an eye tracking system 40, a processing device 42 and an adjustment component. As described above, optical assembly 28 may be used to combine digitally generated virtual images with real world images. Optical assembly 28 may be generally configured as described above. Eye tracking system 40 is configured to generate eye tracking data in response to a user gazing upon virtual image plane A of the HMD. Processing device 42 is coupled to receive eye tracking data from eye tracking system 40, and configured to execute program instructions to calculate the distance, m, between the image plane A of the HMD and the pupil plane C of the user using at least the received data. The adjustment component of the HMD is configured to adjust a position of the HMD with respect to the user based on the calculated distance, m.

Eye tracking system 40 may include substantially any 2D or 3D eye tracking system known in the art. In some embodiments, eye tracking system 40 may include one or more light sources positioned on the HMD for illuminating the user's eyes, and one or more photosensors or cameras positioned on the HMD for detecting light reflected off the user's eyes. In some embodiments, eye tracking system 40 may include a control unit or other processing device (e.g., an Application Specific Integrated Circuit, ASIC, or Silicon on Chip, SoC), which is configured to generate eye tracking data in response to a user gazing upon virtual image plane A of the HMD.

To generate the eye tracking data, eye tracking system 40 may control the one or more light sources to provide illumination to the user's eyes, and may control the one or more photosensors or cameras to detect light reflected from the user's eyes. In one example, the control unit or other processing device of eye tracking system 40 may detect "glints" or reflections of light, which are reflected off the user's eyes, and may use the detected "glints" to determine eye tracking data in response to a user's gaze upon the virtual image plane A of the HMD. As noted above, the eye tracking data provided by the eye tracking system 40 may include at least one of a gaze point location, a gaze direction, one or more gaze vectors, and an inter-pupillary distance (IPD) measurement. The eye tracking system 40 may use any known technique and/or algorithm to calculate the eye tracking data. In some embodiments, the gaze point (GP) location may be fixed at a predefined location along a centerline bisecting the user's eyes (as shown in FIG. 7) when the eye tracking data is generated by the eye tracking system 40.

According to one example embodiment, eye tracking system 40 may be one, which is provided by Pupil Labs of Berlin, Germany. It is noted, however, that eye tracking system 40 is not limited to those specifically provided by Pupil Labs, or to eye tracking systems capable of executing eye tracking algorithms. In some embodiments, eye tracking system 40 may include only light sources and cameras, which provide images of the user's eyes to processing device 42 for further processing.

Processing device 42 is coupled to receive the eye tracking data from eye tracking system 40 and is configured to execute a first set of program instructions to calculate the distance, m, between the virtual image plane A of the HMD and the pupil plane C of the user using the received data. Processing device 42 may execute additional program instructions, as set forth in more detail below. Hardware components suitable for implementing processing device 42 include, but are not strictly limited to, a central processing unit (CPU), a microprocessor, a microcontroller, an embedded controller, an ASIC, a digital signal processor (DSP) and/or another SoC.

In some embodiments, processing device 42 may receive a gaze direction (θ) and an IPD measurement from eye tracking system 40, and may execute the first set of program instructions to calculate the distance, m, using the gaze direction and the IPD measurement. In some embodiments, the distance, m, may be calculated using EQ. 1 above; however, other equations and/or algorithms may also be used.

In other embodiments, processing device 42 may receive a gaze direction (θ) from eye tracking system 40 and an IPD measurement from a position sensor 25 provided on the HMD 10. In such embodiments, HMD 10 may include two optical assemblies 28 (one for each eye), hardware 27 for translating the optical assemblies closer together (to provide smaller IPD distance) or farther apart (larger IPD distance), and a position sensor 25, which is coupled to detect the position of each optical assembly. Translation hardware 27 may include, but is not limited to, a slider and rails, and rotary knobs with rack and pinion gears. Example position sensors 25 include capacitive, optical or resistive linear position sensors. In this embodiment, processing device 42 may use the position detected by the position sensors 25 to calculate an IPD measurement, which may then be used along with the gaze direction from eye tracking system 40 to calculate the distance, m.

In yet other embodiments, processing device 42 may receive a plurality of frames of image data from eye tracking system 40, where each frame corresponds to an image of one of the user's eyes. In such embodiments, processing device 42 may execute the first set of program instructions to measure an inter-pupillary distance (IPD) between the user's eyes, determine a gaze direction from the plurality of frames of image data, and calculate the distance, m, using the IPD measurement and the gaze direction.

In some embodiments, processing device 42 may execute a second set of program instructions to determine the direction (in/out along the Z-axis) and the desired amount ($\Delta z$) with which to adjust the position of HMD 10, so as to position the center plane D of eye box 29 at, or very near, the pupil plane C. In one embodiment, the desired amount ($\Delta z$) may be determined according to EQ. 3.

$$\Delta z = v - m \qquad \text{EQ. 3}$$

where m is the distance (mm) calculated between virtual image plane A and pupil plane C, v is the fixed distance (mm) between virtual image plane A and eye box center plane D, and $\Delta z$ is the desired amount that the position of the HMD 10 should be adjusted to substantially align center plane D with pupil plane C. In $\Delta z$ is less than the acceptable tolerance, t, between pupil plane C and center plane D, the user will be able to view the virtual images presented on the virtual image plane A, since pupil plane C will be positioned within the eye box 29 of the optical assembly 28. However, higher quality virtual images may be obtained when the center plane D of the eye box 29 is positioned at or very near the pupil plane C within a tolerance t millimeters (mm) on either side of plane D (as shown in FIG. 5).

In some embodiments, processing device 42 may execute a third set of program instructions to adjust the position of the HMD automatically without user intervention or assistance. In one example, the adjustment component of HMD 10 may include a stepper motor 46 coupled to pad 48, and a stepper motor controller 44. The stepper motor controller 44 may be coupled to receive signals from processing device 42 for controlling stepper motor 46, so that pad 48 is linearly translated toward or away from the user by the amount ($\Delta z$) needed to substantially align eye box center plane D with pupil plane C. In doing so, processing device 42, stepper motor controller 44, stepper motor 46, and pad 48 may automatically perform the steps necessary to adjust the position of the HMD.

In another example, the adjustment component of HMD 10 may include a stepper motor controller 44 and a stepper motor 46 coupled to optical assembly 28. In this example, stepper motor controller 44 may be coupled to receive signals from processing device 42 for controlling stepper motor 46, so that optical assembly 28 is linearly translated toward or away from the user by the amount ($\Delta z$) needed to substantially align eye box center plane D with pupil plane C. In doing so, processing device 42, stepper motor controller 44, stepper motor 46, and optical assembly 28 may automatically perform the steps necessary to adjust the position of the HMD.

In other embodiments, processing device 42 may execute a fourth set of program instructions to assist the user in adjusting the position of the HMD manually by the desired amount ($\Delta z$). For example, the adjustment component of HMD 10 may include a display 50, which is coupled to processing device 42 for displaying guidance, which the user may use to manually adjust the position of the HMD by the desired amount ($\Delta z$). The guidance displayed on display 50 may be in the form of images, text and/or other visual indication of the direction (e.g., in or out along the Z-axis) and the desired amount ($\Delta z$) by which the position of the HMD should be adjusted to position eye box center plane D at, or very near, the pupil plane C.

In some embodiments, the guidance displayed on display 50 may instruct the user to extend pad 48 toward or away from the user by the desired amount ($\Delta z$). In such embodiments, pad 48 may comprise an extension component (not shown), which enables the pad to be gradually or incrementally translated toward/away from the user. Examples of an extension component that may be used to manually adjust the position of the pad 48 include, but are not limited to, a lever, a rotary knob with a cam that interfaces with a rigid component on a rear side of the pad 48, a rotary knob with a gearset attached, and a linear knob that moves the pad 48 directly. In other embodiments, display 50 may provide the user with specific guidance (in the form of images, text and/or other visual indications) that assists the user in manually repositioning the HMD on the user's face to achieve the desired adjustment ($\Delta z$) in the z-direction. In such embodiments, pad 48 may not be adjustable and/or may be omitted if not needed for user comfort.

In other embodiments, the guidance displayed on display 50 may instruct the user to extend the optical assembly 28 toward or away from the user by the desired amount ($\Delta z$). In such embodiments, an extension component (not shown) may be coupled to the optical assembly 28 to translate the optical assembly toward or away from the user. Examples of an extension component that may be used to manually adjust the position of the optical assembly 28 include, but are not limited to, a slider and rails, a rotary knob and rack and pinion gears.

In some embodiments, the program instructions executed by processing device 42 may be stored within processing device 42, along with calibration data, which may be used by processing device 42 to calculate the distance, m, and/or the desired amount ($\Delta z$) by which to adjust the position of the HMD. Alternatively, the program instructions and/or the calibration data may be stored within a storage medium of the HMD, such as storage medium 52. Storage medium 52 may be substantially any non-transitory, computer readable storage medium including, but not limited to, various forms of read only memory (ROM) and non-volatile random access memory (NVRAM). In some embodiments, the calibration data stored within processing device 42 or storage medium 52 may include the tolerance, t, and the distance, v, between virtual image plane A and eye box center plane D.

In some embodiments, HMD 10 may include one or more additional (optional) sensors 54 for simultaneous localization and mapping (SLAM) tracking, gesture recognition and tracking, 6-degree of freedom (DOF) velocity and acceleration using an inertial measurement unit (IMU), audio input/output (I/O), and eye gaze tracking. In such embodiments, a hub 56 may be included within the HMD 10 for communicating signals and data between eye tracking system 40, additional sensor(s) 54 and processing device 42. Although not strictly limited to such, hub 56 may be a Universal Serial Bus (USB) hub, in one example.

As noted above, FIG. 8 illustrates an embodiment in which all steps of the method shown in FIG. 6 are performed by components of the HMD. In other embodiments, one or more steps of the method shown in FIG. 6 may be performed by an information handling system (or at least a processing component), which is external to the HMD.

Figure 9:
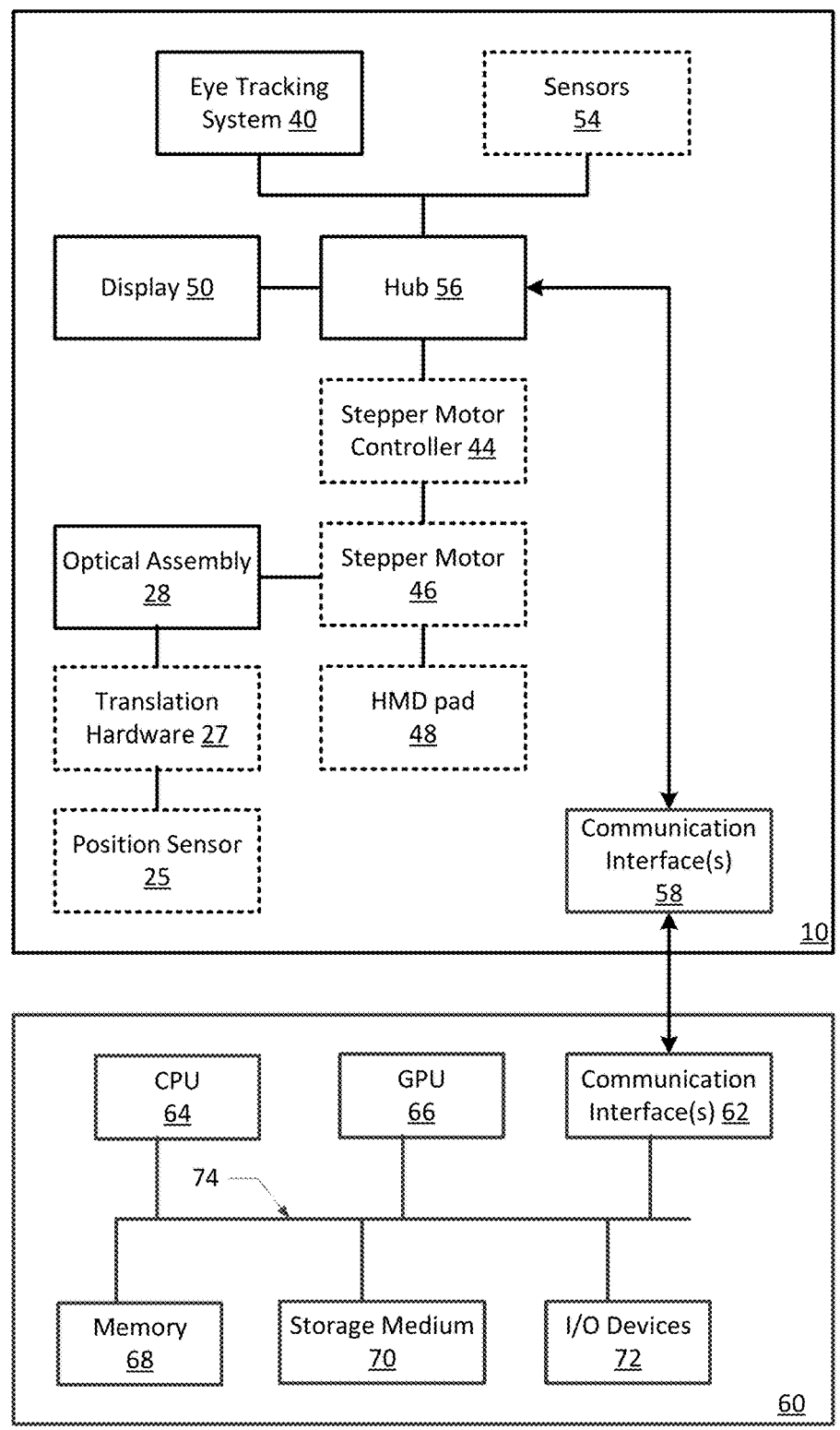
FIG. 9 is a block diagram illustrating one embodiment of a system, including an HMD and an information handling system, configured to perform the method shown in FIG. 6.

FIG. 9 is a block diagram illustrating one embodiment of a system configured to perform the method shown in FIG. 6, where such system includes an HMD 10 and an information handling system 60. The HMD 10 shown in FIG. 9 includes many of the same components, which are included within the HMD 10 shown in FIG. 8 and described above. Components with like reference numerals, including optical assembly 28, translation hardware 27, position sensor 25, eye tracking system 40, stepper motor controller 44, stepper motor 46, pad 48, display 50, optional sensors 54 and hub 56, may be similar to those described above. As such, further description of such components is omitted herein for purposes of brevity.

One difference between the HMDs 10 shown in FIGS. 8 and 9 is that processing device 42 and storage medium 52 are omitted from, and communication interface 58 is added to, the HMD embodiment shown in FIG. 9. In this embodiment, eye tracking system 40 provides eye tracking data (e.g., one or more of gaze point location, gaze direction, gaze vector(s), IPD and/or frames of image data corresponding to images of the user's eyes) to information handling system 60, via hub 56, communication interface 58 and communication interface 62. Communication interfaces 58/62 may include substantially any communication interface known in the art for communicating signals and data across a wired or wireless medium. For example, communication interfaces 58/62 may include, but are not limited to, a USB-C interface, a USB-A interface, or a wireless communication interface, such as Wi-Fi, WiGig or WLAN.

For purposes of this disclosure, an information handling system, such as the information handling system 60 shown in FIG. 9, may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. An information handling system in accordance with the present disclosure may generally include one or more information handling resources. The information handling resources may include any component, system, device or apparatus of the information handling system, including without limitation processors, busses, computer-readable media, input-output devices and/or interfaces, storage resources, network interfaces, motherboards, electro-mechanical devices (e.g., fans), and/or power supplies.

In the generalized embodiment shown in FIG. 9, information handling system 60 includes a communication interface 62 for communicating signals and/or data across a wired or wireless medium to/from HMD 10. In addition to a communication interface, information handling system 60 may also generally include one or more processing devices, such as central processing unit (CPU) 64 and graphics processing unit (GPU) 66, one or more computer readable storage devices, such as system memory 68 (e.g., RAM, ROM and/or cache memory) and nonvolatile storage medium 70 (e.g., NVRAM, ROM, hard disk drive, optical disc drive), and one or more input/output devices 72. Input/output devices 72 may include, but are certainly not limited to, keyboards, mice, touch pads, speakers, and cameras. As shown in FIG. 9, components of the information handling system 60 may be coupled to system interconnect 74 for communicating signals and data there between. The system interconnect 74 depicted in FIG. 9 may represent one or more buses, interfaces, hubs and/or controllers used to transfer information between the system components. Other components not specifically shown in FIG. 9 may also be included within the information handling system.

In the embodiment shown in FIG. 9, communication interface 62 is coupled to receive eye tracking data (e.g., one or more of gaze point location, gaze direction, gaze vector(s), IPD and/or frames of image data corresponding to images of the user's eyes) from eye tracking system 40 of HMD 10 when the HMD is worn, and being used, by a user. The eye tracking data received from HMD 10 is transmitted to CPU 64 via system interconnect 74. Similar to processing device 42 of FIG. 8, CPU 64 may execute a first set of program instructions to calculate a distance, m, between the virtual image plane A of the HMD and the pupil plane C of the user using the received eye tracking data, as explained above. In addition, CPU 64 may execute a second set of program instructions to determine the direction (e.g., in or out along the Z-axis) and the desired amount ($\Delta z$) with which to adjust the position of HMD 10, so as to position the eye box center plane D at, or very near, the pupil plane C. The desired amount ($\Delta z$) may be determined as set forth above. In some embodiments, system memory 68 and/or storage medium 70 may be used to store the program instructions and/or the calibration data used by CPU 64 to calculate the distance, m, and determine the direction (e.g., in or out along the Z-axis) and the desired amount ($\Delta z$) with which to adjust the position of HMD 10.

Once the direction and the desired amount ($\Delta z$) of adjustment is determined, CPU 64 may transmit signals to HMD 10, via system interconnect 74 and communication interface 62, for adjusting a position of at least a portion of the HMD with respect to the user based on the calculated distance, m. The communication interface 58 of HMD 10 receives the signals transmitted from communication interface 62 of information handling system 60. In some embodiments, the signals transmitted from information handling system 60 may be used to automatically adjust the position of the HMD in the direction and by the desired amount ($\Delta z$) without user intervention or assistance. In other embodiments, the signals transmitted from information handling system 60 may be used to assist the user in adjusting the position of the HMD 10 manually in the direction and by the desired amount ($\Delta z$).

In the embodiment of FIG. 9, HMD 10 includes an adjustment component, which uses the signals transmitted from information handling system 60 to adjust the position of the HMD with respect to the user. In some embodiments, the adjustment component of the HMD may include a pad 48, a stepper motor 46 and a stepper motor controller 44. As noted above, pad 48 may be configured to come in contact with at least a portion of the user's face. Stepper motor 46 may be coupled to pad 48 and may be configured to adjust a position of the pad with respect to the user. Stepper motor controller 44 may be coupled to receive the transmitted signals (via, e.g., communication interface 58 and hub 56), and may be configured to use the transmitted signals to control stepper motor 46, so as to extend pad 48 toward or away from the user until the center plane D of the eye box 29 is substantially aligned with the user's pupil plane C. This may be achieved, in this embodiment, by linearly translating the pad 48 in the z-direction by an amount equal to v−m, where v is the fixed distance between the virtual image plane A and the eye box center plane D and, m, is the calculated distance. In such embodiments, the signals transmitted from information handling system 60 may be used by stepper motor controller 44, stepper motor 46, and pad 48 to automatically adjust the position of the HMD in the direction (e.g., in or out along the Z-axis) and by the desired amount (Δz) without user intervention or assistance.

In other embodiments, the adjustment component of the HMD may include a stepper motor controller 44 and a stepper motor 46 coupled to the optical assembly 28. Stepper motor controller 44 may be coupled to receive the transmitted signals (via, e.g., communication interface 58 and hub 56), and may be configured to use the transmitted signals to control stepper motor 46, so as to translate optical assembly 28 toward or away from the user until the center plane D of the eye box 29 is substantially aligned with the user's pupil plane C. This may be achieved, in this embodiment, by linearly translating the optical assembly 28 in the z-direction by an amount equal to v−m, where v is the fixed distance between the virtual image plane A of the HMD and the eye box center plane D and m is the calculated distance. In this manner, the signals transmitted from information handling system 60 may be used by stepper motor controller 44 and stepper motor 46 to automatically adjust the position of optical assembly 28 in the direction (e.g., in or out along the Z-axis) and by the desired amount (Δz) without user intervention or assistance.

In yet other embodiments, the adjustment component of the HMD may include pad 48 and display 50. As before, pad 48 may be configured to come in contact with at least a portion of the user's face. Display 50 may be generally configured to display guidance, which the user may use to manually adjust the position of the HMD in the direction (e.g., in or out along the Z-axis) and by the desired amount (Δz). The guidance displayed on display 50 may be in the form of images, text and/or other visual indication of the direction and amount (Δz) by which the position of the HMD should be adjusted to position eye box center plane D at, or very near, the pupil plane C. The guidance displayed to the user on display 50 of HMD 10 is determined by the signals transmitted from information handling system 60.

In some embodiments, the guidance displayed on display 50 may instruct the user to manually extend the pad 48 or the optical assembly 28 toward or away from the user in the direction and by the desired amount (Δz). In such embodiments, the pad 48 or the optical assembly 28 may comprise an extension component (not shown), which enables the pad to be gradually or incrementally extended toward/away from the user. Examples of suitable extension components are discussed above. In other embodiments, display 50 may provide the user with specific guidance (in the form of images, text and/or other visual indications) that assists the user in manually repositioning the HMD on the user's face to achieve the desired adjustment (Δz). In such embodiments, adjustment and repositioning of the HMD can be achieved, for example, via head positioning component 20, and pad 48 may not be adjustable and/or may be omitted if not needed for user comfort.

It will be understood that one or more of the tasks, functions, or methodologies described herein may be implemented, for example, as firmware or as a computer program of instructions embodied in a non-transitory tangible computer readable medium that is executed by a CPU, controller, microcontroller, processor, microprocessor, FPGA, ASIC, or other suitable processing device.

While the invention may be adaptable to various modifications and alternative forms, specific embodiments have been shown by way of example and described herein. However, it should be understood that the invention is not intended to be limited to the particular forms disclosed. Rather, the invention is to cover all modifications, equivalents, and alternatives falling within the spirit and scope of the invention as defined by the appended claims. Moreover, the different aspects of the disclosed systems and methods may be utilized in various combinations and/or independently. Thus, the invention is not limited to only those combinations shown herein, but rather may include other combinations.

What is claimed is:

1. A method, comprising:
   receiving data from an eye tracking system of a head mounted device (HMD) worn by a user, wherein the data is generated by the eye tracking system in response to the user gazing upon a virtual image plane of the HMD;
   using the received data to calculate a distance between the virtual image plane of the HMD and a pupil plane of the user;
   adjusting a physical position of a pad and/or an optical assembly of the HMD with respect to the user based on the calculated distance; and
   controlling a stepper motor to extend the pad and/or the optical assembly toward or away from the user to adjust the physical position of the pad and/or the optical assembly of the HMD with respect to the user.

2. The method as recited in claim 1, wherein said receiving data comprises receiving a gaze direction and an inter-pupillary distance (IPD) measurement from the eye tracking system, and wherein said distance is calculated using the gaze direction and the IPD measurement.

3. The method as recited in claim 1, wherein said receiving data comprises receiving a gaze direction from the eye tracking system, and wherein the distance is calculated using the gaze direction received from the eye tracking system and an inter-pupillary distance (IPD) measurement received from a position sensor on the HMD.

4. The method as recited in claim 1, wherein said receiving data from an eye tracking system comprises receiving a plurality of frames of image data from the eye tracking system, wherein each frame corresponds to an image of one of the user's eyes.

5. The method as recited in claim 4, wherein the distance is calculated by:
   using the plurality of frames of image data to measure an inter-pupillary distance (IPD) between the user's eyes and determine a gaze direction; and
   using the IPD measurement and the gaze direction to calculate the distance.

6. The method as recited in claim 1, wherein the optical assembly is configured to combine virtual images with what the user sees in their physical environment, and wherein the optical assembly comprises an eye box within which the virtual images are projected towards the user's eye and an eye box center plane located at a center point of the eye box.

7. The method as recited in claim 6, wherein said adjusting a physical position comprises linearly translating the pad of the HMD toward or away from the user until the eye box center plane is substantially aligned with the pupil plane.

8. The method as recited in claim 6, wherein said adjusting a physical position comprises linearly translating the optical assembly toward or away from the user until the eye box center plane is substantially aligned with the pupil plane.

9. The method as recited in claim 1, comprising contacting a face of the user with the pad, and controlling the stepper motor to extend the pad toward or away from the user to adjust the physical position of the pad of the HMD with respect to the user.

10. A head mounted device (HMD) configured to be worn by a user, the HMD comprising:
   a pad provided on the HMD, wherein the pad is configured to come in contact with at least a portion of the user's face;
   at least one optical assembly provided within the HMD, wherein the at least one optical assembly is configured to combine virtual images on a virtual image plane of the HMD with real world images;
   an eye tracking system configured to generate data in response to the user gazing upon the virtual image plane of the HMD;
   a processing device coupled to receive the data from the eye tracking system and configured to execute program instructions to calculate a distance between the virtual image plane of the HMD and a pupil plane of the user using the received data; and
   an adjustment component configured to adjust a physical position of the pad and/or the at least one optical assembly in a direction perpendicular to the pupil plane of the user based on the calculated distance.

11. The head mounted device as recited in claim 10, wherein data received from the eye tracking system comprises a gaze direction and an inter-pupillary distance (IPD) measurement, and wherein the processing device is configured to execute the program instructions to calculate the distance using the gaze direction and the IPD measurement.

12. The head mounted device as recited in claim 10, wherein data received from the eye tracking system comprises a gaze direction, and wherein the processing device is configured to execute the program instructions to calculate the distance using the gaze direction received from the eye tracking system and an IPD measurement received from a position sensor on the HMD.

13. The head mounted device as recited in claim 10, wherein data received from the eye tracking system comprises a plurality of frames of image data from the eye tracking system, each frame corresponding to an image of one of the user's eyes, and wherein the processing device is configured to execute the program instructions to:
   measure an inter-pupillary distance (IPD) between the user's eyes and determine a gaze direction from the plurality of frames of image data; and
   calculate the distance using the IPD measurement and the gaze direction.

14. The head mounted device as recited in claim 10, wherein the at least one optical assembly comprises an eye box within which the virtual images are projected towards the user's eye and an eye box center plane located at a center point of the eye box.

15. The head mounted device as recited in claim 14, wherein the adjustment component is configured to adjust the physical position of the pad and/or the at least one optical assembly by linearly translating the pad and/or the at least one optical assembly toward or away from the user until the eye box center plane is substantially aligned with the pupil plane.

16. The head mounted device as recited in claim 15, wherein the adjustment component comprises:

a stepper motor coupled to the pad; and
a stepper motor controller coupled to receive signals from the processing device for controlling the stepper motor, so as to perform the linear translation by extending the pad toward or away from the user.

17. The head mounted device as recited in claim 15, wherein the adjustment component comprises:
   a stepper motor coupled to the at least one optical assembly; and
   a stepper motor controller coupled to receive signals from the processing device for controlling the stepper motor, so as to perform the linear translation by extending the at least one optical assembly toward or away from the user.

18. The head mounted device as recited in claim 15, wherein the adjustment component comprises:
   a display of the HMD; and
   program instructions executable by the processing device for displaying guidance to the user on the display of the HMD, wherein the user uses the displayed guidance to perform the linear translation manually by extending the pad and/or the at least one optical assembly toward or away from the user.

19. A system, comprising:
   a head mounted device (HMD) configured to be worn by a user, the HMD comprising:
      an eye tracking system configured to generate eye tracking data in response to the user gazing upon a virtual image plane of the HMD; and
      a communication interface configured to transmit the eye tracking data;
   an information handling system comprising:
      a communication interface configured to receive the eye tracking data transmitted from the communication interface of the HMD; and
      a processing device configured to execute program instructions to:
         calculate a distance between the virtual image plane of the HMD and a pupil plane of the user using the received eye tracking data; and
         transmit signals, via the communication interface of the information handling system to the communication interface of the HMD, for adjusting a physical position of the at least one structural component of the HMD with respect to the user based on the calculated distance;
   wherein the communication interface of the HMD is further configured to receive the signals transmitted from the communication interface of the information handling system; and
   wherein the HMD further comprises an adjustment component configured to use the transmitted signals to adjust the physical position of the at least one structural component of the HMD with respect to the user based on the calculated distance.

20. The system as recited in claim 19, wherein the HMD further comprises:
   a pad provided on the HMD, wherein the pad is configured to come in contact with at least a portion of the user's face; and
   at least one optical assembly configured to combine virtual images on the virtual image plane with real world images, and wherein the optical assembly comprises an eye box within which the virtual images are projected towards the user's eye and an eye box center plane located at a center point of the eye box; and wherein the adjustment component is configured to use the transmitted signals to linearly translate the pad and/or the optical assembly in a direction perpendicular to the pupil plane until the eye box center plane is substantially aligned with the pupil plane.

21. The system as recited in claim 20, wherein the adjustment component comprises:
a stepper motor coupled to the pad; and
a stepper motor controller coupled to receive the transmitted signals and configured to use the transmitted signals to control the stepper motor, so as to extend the pad toward or away from the user until the eye box center plane is substantially aligned with the pupil plane.

22. The system as recited in claim 20, wherein the adjustment component comprises:
a stepper motor coupled to the at least one optical assembly; and
a stepper motor controller coupled to receive the transmitted signals and configured to use the transmitted signals to control the stepper motor, so as to extend the optical assembly toward or away from the user until the eye box center plane is substantially aligned with the pupil plane.

23. The system as recited in claim 20, wherein the adjustment component comprises:
a display of the HMD, wherein the display is configured to display guidance to the user to manually extend the pad or the at least one optical assembly toward or away from the user until the eye box center plane is substantially aligned with the pupil plane, wherein the guidance displayed to the user on the display is determined by the transmitted signals.

24. A method, comprising:
receiving data from an eye tracking system of a head mounted device (HMD) worn by a user, wherein the data is generated by the eye tracking system in response to the user gazing upon a virtual image plane of the HMD;
using the received data to calculate a distance between the virtual image plane of the HMD and a pupil plane of the user;
determining a difference between the calculated distance and an eye box center plane of an optical assembly included within the HMD; and
linearly translating at least one structural component of the HMD in a direction perpendicular to the pupil plane of the user by an amount substantially equal to the difference between the calculated distance and the eye box center plane.

25. The method as recited in claim 24, wherein said linearly translating at least one structural component of the HMD comprises linearly translating a pad of the HMD toward or away from the pupil plane of the user until the eye box center plane is substantially aligned with the pupil plane.

26. The method as recited in claim 24, wherein said linearly translating at least one structural component of the HMD comprises linearly translating the optical assembly toward or away from the pupil plane of the user until the eye box center plane is substantially aligned with the pupil plane.

* * * * *